June 7, 1932.　　　G. TREMOLADA　　　1,861,485
SWIVEL HAVING COOLING MEANS
Filed Feb. 25, 1929　　3 Sheets-Sheet 2
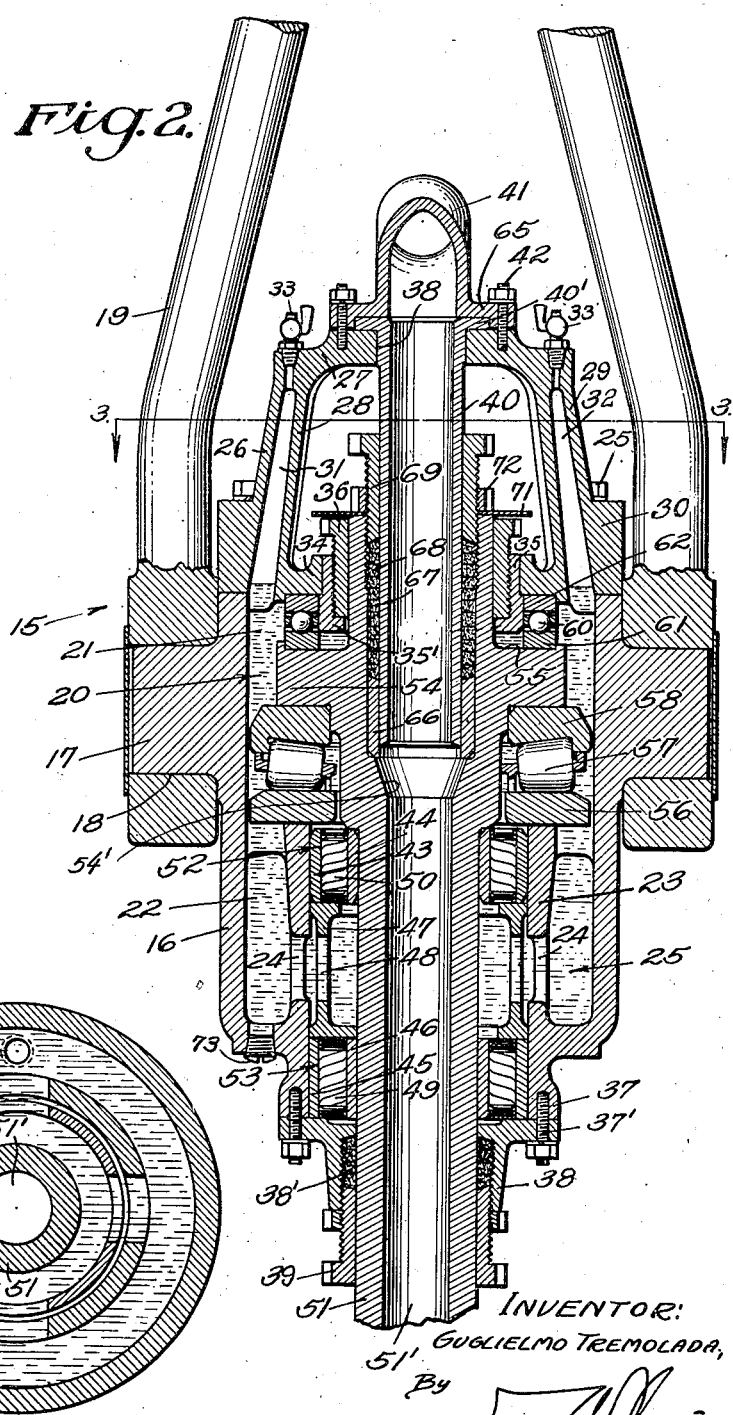
Fig.2.
Fig.5.
INVENTOR:
GUGLIELMO TREMOLADA,
By
ATTORNEY.

INVENTOR:
GUGLIELMO TREMOLADA,
By

ATTORNEY.

Patented June 7, 1932

1,861,485

UNITED STATES PATENT OFFICE

GUGLIELMO TREMOLADA, OF HOLLYWOOD, CALIFORNIA, ASSIGNOR TO EMSCO DERRICK & EQUIPMENT COMPANY, OF LOS ANGELES, CALIFORNIA, A CORPORATION OF CALIFORNIA

SWIVEL HAVING COOLING MEANS

Application filed February 25, 1929. Serial No. 342,637.

My invention relates to a novel form of swivel such as is used in the oil-well industry.

In drilling a well by the rotary method, it is customary to secure a suitable rotary cutter to the lower end of a string of drill pipe. This pipe extends downward into the well and is rotated at the surface of the ground by a suitable rotary machine. It is customary to force a suitable mud through the drill pipe during the drilling operation in order to help the cutting properties of the bit, and also to raise the cuttings to the surface of the ground. This requires a swivel joint which will transmit the mud from a stationary element to a movable element, and this swivel must be able to withstand high pressures and must be in fluid-tight relationship with the drill pipe.

It is an object of my invention to provide a swivel having lubricant cooling means.

When the well has reached a suitable depth, it is necessary to support the drill pipe from the swivel in order that too much pressure may not be applied to the rotary cutter. It is likewise necessary to provide radial and thrust bearings in the swivel and to properly lubricate the parts thereof.

The usual form of radial bearing utilized is of the sleeve type which quickly wears and allows the stationary and movable elements to become disaligned and the parts to wear.

It is an object of my invention to provide a swivel, utilizing a splash system for lubricating the roller bearings which journal a rotating element thereof.

I prefer to operate the bearings in a chamber filled with light lubricating oil and provide a packing between the stationary and rotatable elements. This packing is concentric with and surrounds the upper end of the swivel body.

It is an object of my invention to provide means for centrifugally lubricating the bearings so as to cause the displacement and cooling of the heated lubricating oil.

It is customary to pack grease within the body of the swivel to lubricate the parts. Inasmuch as these parts are subjected to wear and shock, improper lubrication, that is to say, overheated oil, causes evaporation of the oil and results often in throwing the fluid-conducting member out of alignment with the rotatable member.

It is an object of my invention to provide a stationary fluid-conducting member having a flange by which it is suspended from the body of the device so as to be easily removed from the assembly without the swivel being taken apart, and which at all times is maintained in correct alignment with the rotatable fluid-conducting member.

Further objects and advantages of my invention will be made evident hereinafter.

Referring to the drawings in which I illustrate the preferred embodiment of my invention:

Fig. 2 is a vertical sectional view.

Fig. 5 is a cross-sectional view taken on the line 5—5 of Fig. 1.

Figure 1:
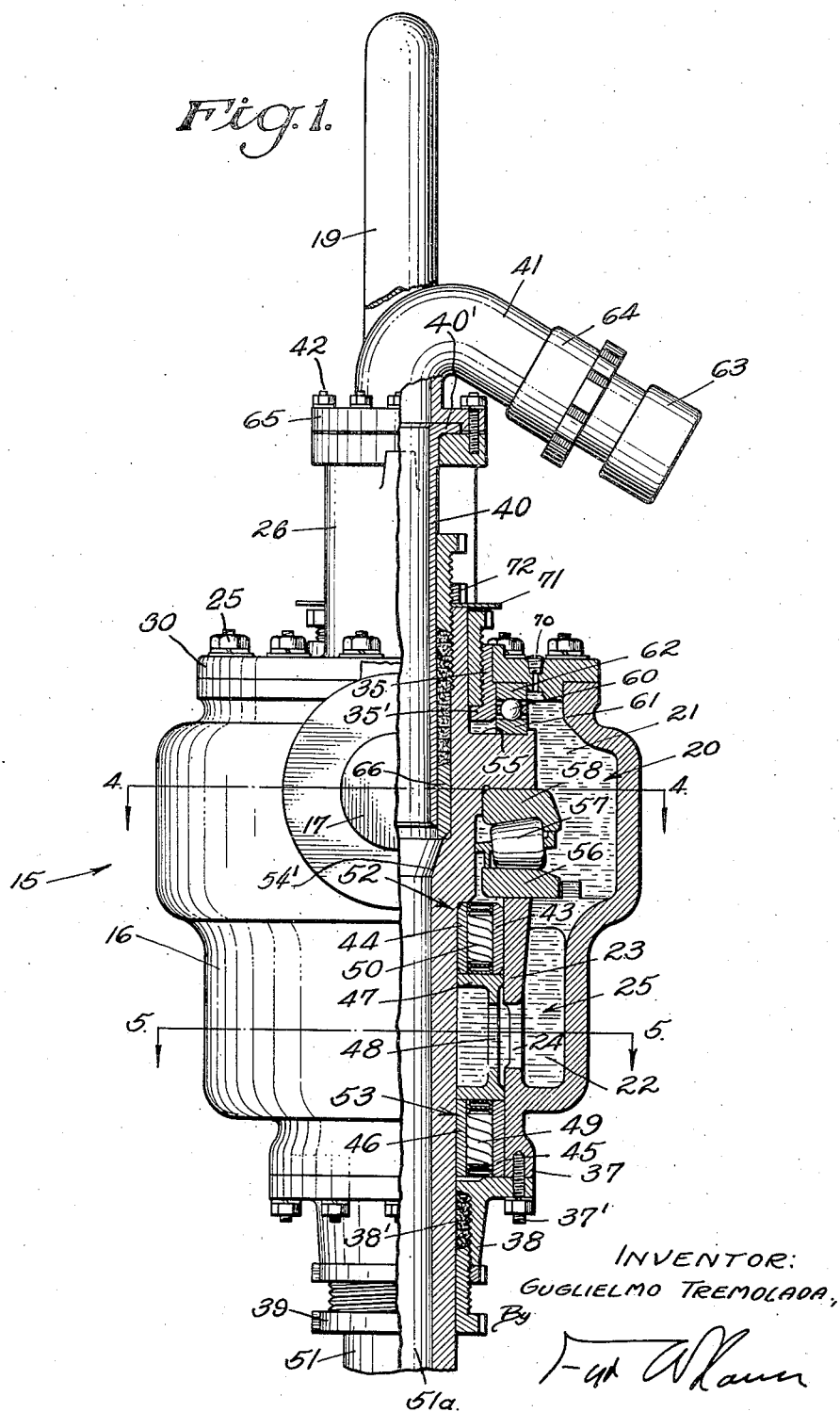
Fig. 1 is an elevational view of my invention with portions broken away and in section to illustrate the assembly of the improved swivel.
Figure 3:
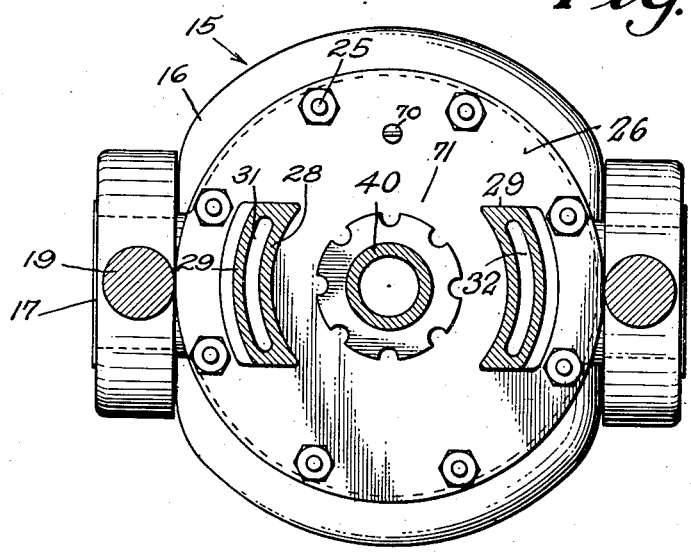
Fig. 3 is a cross-sectional view taken on the line 3—3 of Fig. 2.
Figure 4:
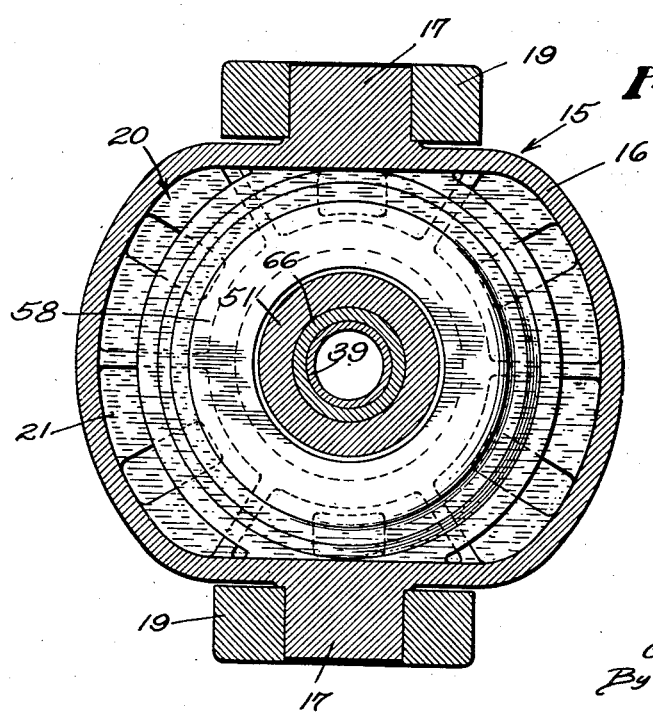
Fig. 4 is a cross-sectional view taken on the line 4—4 of Fig. 1.

In one method of drilling, a suitable bit is secured to the lower end of a drill pipe which extends to the surface of the ground, this drill pipe being rotated by a rotary machine secured to the derrick floor. The upper end of the drill rod is rotatably supported by a swivel 15 incorporating the features of my invention. This swivel comprises a body 16 having trunnions 17 projecting therefrom. Eyes 18 of a bail 19 are journaled on these trunnions. The bail 19, in turn, is supported by a link connected to a travelling block supported on ropes from the top of the derrick so as to be vertically movable. These elements, being common to the art, are not illustrated.

Referring particularly to Fig. 2 the body 16 has an oil and bearing chamber 20 provided therein which is formed of upper and lower sections 21 and 22. Formed integral with the lower part of the body 16 and extending upwardly into the lower section 22 is an annular collar 23 which is spaced from the interior wall of the body 16 and is provided with openings 24 communicating with the lower section 22 of the oil chamber 20. The lower section 22 of the chamber 20 forms a continuation of the upper section 21. Mounted on the body 16 and secured thereto by bolts 25 is a cover member 26. The upper end of the member 26 comprises a top portion 27 and oppositely disposed semi-arcuate depending portions 28 and 29, which terminate in a base 30, the latter being connected to the body by the bolts 25. The depending portions 28 and 29 are formed with chambers 31 and 32 which communicate at their lower ends with the upper section 21 of the lubricant holding chamber 20 of the body. The walls defining the chambers 31 and 32 converge toward the top 27 of the cover, so that the cross-sectional area of the chambers 31 and 32 is greater adjacent the base than adjacent the top portion 27 of the cover. The upper end of the cover member 26 is provided with vents leading from the chambers 31 and 32 in which are mounted pet-cocks 33 communicating with the atmosphere. The inner part of the base 30 is formed with an inwardly directed annular flange 34 in which is mounted an interiorly threaded sleeve 35 having an inwardly directed flange 35′. A bushing 36 is threaded into the sleeve 35 and surrounds the upper end of a sleeve 51, the outer surface of the sleeve 51 having bearings thereon.

A bearing support 37 is integral with and depends from the lower end of the body 16, and connected by bolts 37′ to said bearing support 37 is a bearing support stuffing box collar 38 which carries a packing 38′. The collar 38 is interiorly screw threaded for the reception of the threaded upper end of a stuffing box gland element 39.

Extending through an opening provided centrally in the upper end of the cover member 26 is a wash pipe 40 having a flanged upper end 40′ which seats on the upper end 27 of the cover member 26. A gooseneck 41 is adapted to fit upon the flanged end 40′ of the wash pipe 40, and bolts 42 serve to hold the gooseneck 41 to the upper end of the cover member 26 and the wash pipe 40 in fixed relation to the cover member 26.

Mounted in the lower section 22 of chamber 20 and in the space defined by the annular collar 23 is a pair of races 43 and 44, while mounted in the bearing support 37 is a pair of races 45 and 46. These pairs of races are separated by a lantern 47 having openings 48 which register with the openings 24 of the collar 23. Adapted to be retained in position between races 43 and 44, and 45 and 46 by lantern 47 are series of rollers 50 and 49, which bear particularly against the inner races 44 and 46. These inner races snugly engage the outer periphery of the sleeve 51 so that the inner and outer races, together with the rollers 49 and 50, co-operate to provide upper and lower radial bearings 52 and 53 which journal the sleeve 51 in the body 16.

Formed near the upper end of the sleeve 51 is a hub 54 having an annular flange 55 extending outwardly therefrom. Positioned on the upper end of the collar 23 is a lower roller plate 56, and operable on the plate 56 is a series of cone bearings 57 which engage against an upper plate 58 attached to the lower surface of the flange portion 55 of hub 54. The cone bearings 57 and the plates 56 and 58 directly support the hub 54 and consequently the sleeve 51 which receives in its upper end the lower part of the wash pipe 40 by a connecting means screwed thereto.

The upper end of the body 16 is open so as to permit the installation of the bearings therein. This upper end is closed, as heretofore stated, by the cover member 26 secured thereto by the bolts 25. Interposed between flange 34 of the cover member 26 and the upper surface of the hub flange 55 is a series of thrust bearings 60 disposed between races 61 and 62 which prevent the sleeve 51 from rising, should any upward pressure be placed thereon. The bearings 60 correctly position the hub flange 55 relative to the body so that there is no axial movement therebetween.

A fluid-supply means, best illustrated in Fig. 1, is adapted to supply rotary mud through the pipe 40 to a bit on the lower end of the sleeve 51 and comprises a pump, not illustrated, which draws the mud fluid from a sump into an extended pipe whence it is conducted through a flexible hose. A coupling is provided on the end of the hose, this coupling being threadedly received by a hose connection 63. A clamping collar 64 clamps the hose connection 63 to the outer end of a gooseneck connecting member 41. This gooseneck 41 has a counterbored flange 65 which is secured to the cover member 26 by the bolts 42.

I prefer to place a gasket between the countersunk portion of the flange 65 and the flange 40′ of the wash pipe 40. The fluid passing through the hose is thus forced through the gooseneck and through the pipe 40, whence it passes downward through an opening in the sleeve 51 to the interior of the drill pipe and resultantly the bit attached thereto.

To prevent any leakage of this fluid around the pipe 40 at its point of connection with the sleeve 51, I provide a packing-retaining member 66 positioned at the lower end of a counterbore 67 formed in the upper end of the sleeve 51, this member 66 being adapted to receive the lower end of the pipe 40. A main packing 68 is positioned above the packing-retaining member 66 and may be compressed by the adjustment of an externally threaded gland 69 which is threadedly received in the upper end of the counterbore 67. At the intersection of the lower end of the counterbore 67 and the upper end of the opening 51', the hub 54 is chamfered as at 54', so as to allow the liquefied mud under any back pressures that may occur to force the gland 66 upwardly and compress the packing 68 tightly around the mud fluid pipe 40.

I prefer to fill the bearing chamber 20 with a light lubricating oil introduced therein through a suitable inlet or vent 70 in the cover member 26. The packing 38' prevents this oil from flowing from the lower section 22 of the oil chamber 20.

It is highly desirable that no foreign fluid such as drilling mud should reach the oil in the lubricating chamber 20. Should the main packing 68 not be correctly adjusted in tight relationship with the upper end of the sleeve 51, a leakage of mud might occur around the gland 69, this mud having a tendency to work into the bearing chamber 20 if the packing 68 is not correctly adjusted. To prevent this, I provide a disc 71 which rests on the upper end of the sleeve 51, and is clamped thereto by a nut 72 threaded on the gland 69.

This disc 71 rotates with the sleeve 51 when the rotary machine is operated, and any mud or other foreign material reaching the upper surface of this disc will be thrown outwardly therefrom by centrifugal force so that there will be no possibility of foreign matter being discharged on the gland 69.

I provide roller bearings 60 to compensate for any radial thrust of the sleeve 51, and these thrust bearings 60 operating between race plates 61 and 62 are held in position by the cover 26, sleeve 35 and flange 35'. Swivels at present in use in the oil-well industry provide sleeve bearings to take this radial thrust, and these bearings require frequent replacement due to the jars transmitted thereto by the irregularities encountered in the drilling operations. Sleeve bushings are prematurely destroyed owing to the heavy impact of the whipping action of the kelly. The substitution of the roller bearings for sleeve bearings at this point increases the life of the swivel by insuring a perfect working clearance of the sleeve, and a correct alignment of the sleeve 51 with the pipe 40.

If proper lubrication is not maintained, an unequal distribution of the lubricant will occur over the entire surface of the thrust bearing, thus prematurely wearing this and the other bearings.

The novel slip mounting of the pipe 40 in the cover 26 is also important to my invention. This pipe is turned, ground, and hardened so as to withstand wear, and no threads are cut therein to decrease the strength thereof or to become sheared or jammed through continued use of the swivel.

This novel supporting means for the pipe 40 insures a perfect alignment with the sleeve 51, and the bolts 42 prevent any rotation of the pipe 40. In this manner the pipe 40 may be readily moved from the swivel without dismantling the latter.

The oil introduced into the oil jacket 20 due to centrifugal force is constantly agitated, and such agitation heats the oil so it will rise and form a mist in the chambers 31 and 32. The outer walls of the depending portions 28 and 29 of the top being exposed to the atmosphere, the misted lubricant in the chambers 31 and 32 is thus cooled.

By providing the pet-cocks in the vents leading from the chambers 31 and 32 heat generated in the chambers may be evacuated to the atmosphere at intervals by the proper adjustment of the pet-cocks.

As heretofore stated, lubricating oil is introduced into the oil jacket 20 through the inlets 70, and for draining off the spent oil I provide suitable outlets which are closed by plugs 73 as illustrated in Fig. 2.

I claim as my invention:

1. In a swivel, the combination of: a body providing a lubricant chamber; a sleeve rotatable in said chamber; bearing means in said chamber below the normal lubricant level; sealing means for preventing a leakage of lubricant around said sleeve; and means providing a vapor chamber above said lubricant chamber and above the normal lubricant level, into which vapor from said lubricant chamber may rise.

2. In a swivel, the combination of: a body providing a lubricant chamber; a sleeve rotatable in said chamber; bearing means in said chamber below the normal lubricant level; sealing means for preventing a leakage of lubricant around said sleeve; means providing a vapor chamber above said lubricant chamber and above the normal lubricant level, into which vapor from said lubricant chamber may rise; and vent means provided in the upper part of said vapor chamber, whereby vapor may be released from said vapor chamber if desired.

3. In a swivel, the combination of: a body providing a lubricant chamber; a sleeve rotatable in said chamber; bearing means in said chamber below the normal lubricant level; sealing means for preventing a leakage of lubricant around said sleeve; a wash pipe supporting member secured to the upper part of said body, said wash pipe supporting member providing a vapor chamber above said lubricant chamber and above the normal lubricant level, into which vapor from said lubricant chamber may rise; and a wash pipe supported by said wash pipe supporting member and extending into communication with said sleeve.

4. In a swivel, the combination of: a body providing a lubricant chamber; a sleeve rotatable in said chamber; bearing means in said chamber below the normal lubricant level; sealing means for preventing a leakage of lubricant around said sleeve; a wash pipe supporting member secured to the upper part of said body, said wash pipe supporting member providing a vapor chamber above said lubricant chamber and above the normal lubricant level, into which vapor from said lubricant chamber may rise; vent means provided in the upper part of said vapor chamber, whereby vapor may be released from said vapor chamber if desired; and a wash pipe supported by said wash pipe supporting member and extending into communication with said sleeve.

5. In a swivel, the combination of: a body providing a lubricant chamber; a sleeve rotatable in said chamber; bearing means in said chamber below the normal lubricant level; sealing means for preventing a leakage of lubricant around said sleeve; a wash pipe supporting member secured to the upper part of said body having a plurality of legs and a top portion supported at the upper end of said legs, each of said legs providing a vapor chamber above said lubricant chamber and above the normal lubricant level, into which vapor from said lubricant chamber may rise; and a wash pipe supported by said top portion of said wash pipe supporting member and extending into communication with said sleeve.

6. In a swivel, the combination of: a body providing a lubricant chamber; a sleeve rotatable in said chamber; bearing means in said chamber below the normal lubricant level; sealing means for preventing a leakage of lubricant around said sleeve; a wash pipe supporting member secured to the upper part of said body having a plurality of legs and a top portion supported at the upper end of said legs, each of said legs providing a vapor chamber above said lubricant chamber and above the normal lubricant level, into which vapor from said lubricant chamber may rise; a wash pipe supported by said top portion of said wash pipe supporting member and extending into communication with said sleeve; and vent means provided at the upper part of each of said vapor chambers whereby vapor may be released from said vapor chamber if desired.

In testimony whereof, I have hereunto set my hand at Los Angeles, California, this 13 day of Feb., 1929.

GUGLIELMO TREMOLADA.